United States Patent
Browne (10) Patent No.: US 11,507,604 B1
(45) Date of Patent: *Nov. 22, 2022

(54) AUTOMATED PERSONA FEATURE SELECTION

(71) Applicant: Quantcast Corporation, San Francisco, CA (US)

(72) Inventor: William Kennedy Browne, San Francisco, CA (US)

(73) Assignee: Quantcast Corporation, San Francisco, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 16/987,755

(22) Filed: Aug. 7, 2020

Related U.S. Application Data (63) Continuation of application No. 15/201,229, filed on Jul. 1, 2016, now Pat. No. 10,740,359.

(51) Int. Cl.
  *G06F 16/28* (2019.01)
  *G06F 16/958* (2019.01)
(52) U.S. Cl.
  CPC .......... *G06F 16/285* (2019.01); *G06F 16/958* (2019.01)
(58) Field of Classification Search
  CPC .............................. G06F 16/285; G06F 16/958
  See application file for complete search history.

(56) References Cited

U.S. PATENT DOCUMENTS

| | | | |
|---|---|---|---|
| 2015/0287091 A1* | 10/2015 | Koran | G06Q 30/0277 705/14.66 |
| 2017/0024455 A1* | 1/2017 | Powell | G06F 16/285 |

OTHER PUBLICATIONS

United States Office Action, U.S. Appl. No. 15/201,229, dated Dec. 13, 2019, 21 pages.
United States Office Action, U.S. Appl. No. 15/201,229, dated Jun. 10, 2019, 22 pages.

* cited by examiner

*Primary Examiner* — Mark D Featherstone
*Assistant Examiner* — Ranjit P Doraiswamy
(74) *Attorney, Agent, or Firm* — Andrea Wheeler (57) ABSTRACT

Embodiments of the invention include a system for automated persona feature selection. Soft clusters of entities are received, each entity having a history of features. Each feature has a general prevalence coefficient representing prevalence of entities having the respective feature in their history. A feature list is generated for each cluster, each feature having an in-cluster coefficient representing prevalence of entities in the cluster having the feature in their history. Features having an in-cluster coefficient that is different from that feature's general prevalence coefficient are selected. A variance across the clusters is determined for each selected feature. A discriminating feature list having high variance features is generated for each cluster. Clusters are selected for an entity by comparing the features of the entity's history to features of the discriminating feature lists of the clusters. Content is customized according to the chosen clusters and sent to the entity.

21 Claims, 6 Drawing Sheets

FIG. 1

|  | Feature A | Feature B | Feature C | Feature D |
|---|---|---|---|---|
| Cluster 1 | .4 | .2 | .9 | .3 |
| Cluster 2 | .4 | .5 | .6 | 0 |
| Cluster 3 | .4 | .1 | .3 | 0 |
| Cluster 4 | .4 | 0 | .1 | 0 |

FIG. 2A

|  | Feature A | Feature B | Feature C | Feature D |
|---|---|---|---|---|
| General Prevalence Coefficient | .4 | .2 | .48 | .075 |

FIG. 2B

|  | Feature A | Feature B | Feature C | Feature D |
|---|---|---|---|---|
| Cluster 1 | - | - | .85 | .25 |
| Cluster 2 | - | .45 | .55 | .05 |
| Cluster 3 | - | .15 | .35 | .05 |
| Cluster 4 | - | .05 | .15 | .05 |
| Variance | - | .029 | .067 | .017 |

FIG. 2C

```
┌─────────────────────────────────────────────┐
│   Generate a feature list for each cluster  │
│                    301                      │
└─────────────────────────────────────────────┘

┌─────────────────────────────────────────────┐
│              Prune feature lists            │
│                    302                      │
└─────────────────────────────────────────────┘

┌─────────────────────────────────────────────┐
│ Determine variance across clusters of features in pruned feature lists │
│                    303                      │
└─────────────────────────────────────────────┘

┌─────────────────────────────────────────────┐
│        Generate discriminating feature lists│
│                    304                      │
└─────────────────────────────────────────────┘

┌─────────────────────────────────────────────┐
│         Choose clusters for specified entity│
│                    305                      │
└─────────────────────────────────────────────┘

┌─────────────────────────────────────────────┐
│        Customize according to chosen clusters│
│                    306                      │
└─────────────────────────────────────────────┘

┌─────────────────────────────────────────────┐
│      Send customized content to specified entity│
│                    307                      │
└─────────────────────────────────────────────┘
```

AUTOMATED PERSONA FEATURE SELECTION

CROSS-REFERENCE TO RELATED APPLICATIONS

This application is a continuation of U.S. Non-Provisional Application Number 15/201,229 entitled "Automated Persona Feature Selection" by William Kennedy Browne, filed on Jul. 1, 2016, which is hereby incorporated by reference in its entirety."

BACKGROUND

Technical Field

This invention pertains in general to customizing content and in particular to customizing content in a real time environment.

Description of Related Art

In general, content providers, such as websites and other networked publishers, seek to present their audiences with highly relevant content. However, the decision regarding which content to send to a browser must be accomplished very rapidly to avoid interfering with the end user's browsing experience. Some websites may customize the content they deliver to an entity, such as a browser, according to a feature of the entity such as browser language preference (e.g. English, German, French). In some cases, an end user may provide interest information to a website, which may subsequently use the provided interest information to direct customized content to the end user's browser.

While sophisticated behavioral modeling techniques exist to model hard clustered customer behaviors, operating large behavioral models can be resource intensive and slow. As a result, applying a large behavioral model in real time (e.g. between the time a browser requests content and the time it is sent to the browser for display) is not always possible; accordingly applying multiple large behavioral models in real time, is unrealistic in many circumstances. Furthermore, many features which strongly correlate with a particular cluster, such as a visit to an advertiser's website, tend to be very low frequency features. Because an entity in the general population is unlikely to have a highly correlated but low frequency feature in their web visitation history, a highly correlated and low frequency feature isn't very useful in selecting a cluster. To remedy this problem, modelers may include a large number of features in behavioral models, in order to expand the applicability of the model. Unfortunately, a larger behavioral model may be applicable to a larger audience than a smaller behavioral model, but operating a large behavioral model can take additional time and resources, making usage of a large behavioral model unrealistic when a quick result is required. What is needed is an automated way to select a limited number of features which are relevant to a large population for each of a plurality of soft clusters, enabling the rapid and accurate selection of one or more soft clusters for an online entity.

SUMMARY

Embodiments of the invention include a method, a non-transitory computer-readable storage medium and a system for delivering customized content to online entities, such as Internet browsers. In an embodiment, histories of a plurality of entities are received. Each respective history comprises a plurality of features, such as a website visitation history. The entities can be soft clustered, with each entity assigned to one or more clusters. A soft cluster can represent a persona or combinations of soft clusters can represent a persona. A feature list is generated for each respective cluster by selecting features prevalent in the histories of the entities assigned to the respective cluster. A discriminating feature list is generated for each cluster by selecting features from the respective cluster's feature list which exhibit high variance in their prevalence across the clusters. Intuitively, rare and highly discriminating features are attractive to a marketer because they can be used to target an entity very accurately. However, using only rare and highly discriminating features for selecting a cluster does not produce a scalable targeting mechanism. This is because rare features are irrelevant when assessing most histories (i.e. it is unlikely that the rare features will be found in many histories). Advantageously, the discriminating feature lists produced by embodiments of the invention will comprise a limited number of automatically selected features which are both prevalent and discriminating, and thus broadly applicable to a large number of entities. As a result, a meaningful decision regarding a specified entity's similarity to a cluster can be rapidly made from limited information for many histories. Furthermore, because of the compact nature of the discriminating feature lists, the specified entity's similarity to each of a plurality of clusters can be determined within a very small time window (e.g. between the time a browser requests content from a publisher and the time the publisher selects and sends content to the browser). One or more clusters may be chosen for a specified entity, responsive to receiving the specified entity's history, by comparing features of the specified entity's history to features of the discriminating feature lists of the respective clusters. Content can be customized according to the chosen cluster(s) and delivered to the specified entity within a very narrow time slice, with the clusters selected using a fresh history of the specified entity, without interfering with the entity's browsing experience.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. is a high-level block diagram of a computing environment for sending customized content (e.g. customized web page, customized advertising content), to an entity (e.g. a browser), responsive to a request from the entity, in accordance with an embodiment of the invention.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention for delivering customized content to online entities, such as Internet browsers. Compact feature sets are automatically generated from web visitation histories of entities which have been assigned to soft clusters. The compact feature sets are selected using a Bernoulli mixture model with nearest shrunken centroids methodology. Discriminating feature lists are generated for each cluster by selecting features which are both prevalent and discriminating and are specifically selected for their high inter-cluster variance. As a result, a meaningful decision regarding a specified entity's similarity to a cluster can be rapidly made from limited information for many histories. One or more clusters may be chosen for a specified entity, responsive to receiving the specified entity's history, by comparing features of the specified entity's history to features of the discriminating feature lists of the respective clusters. A similarity between features in an entity's history and the cluster discriminating feature lists can be used to make decisions about what kind of content to present to the entity. Content can be customized according to the chosen cluster(s) and delivered to the specified entity. Advantageously, highly relevant information can be selected and presented to an online user without incurring unacceptable delays or interfering with the online user's browsing experience. Furthermore, because the similarity between the features in a specified entity's history and the cluster discriminating features lists can be made after the specified entity requests content and before the content is sent to the specified entity, a fresh history of the specified entity can be used when selecting or customizing content for delivery to the specified entity.

Embodiments of the invention are described below in the context of displaying customized content to an online user as they go about their normal browsing activities. Embodiments of the invention are described below in the context of a real-time bidding advertising exchange for opportunities to display advertisements to users through their web browsers. It is noted that similar techniques as those described below can be used in targeting advertisements in the context of other kinds of auctions and advertising exchanges systems, for use with browser-based advertisements or other types of networked media as well. Such techniques are particularly useful where rapid decisions regarding advertisement opportunities are desirable.

Figure 1:
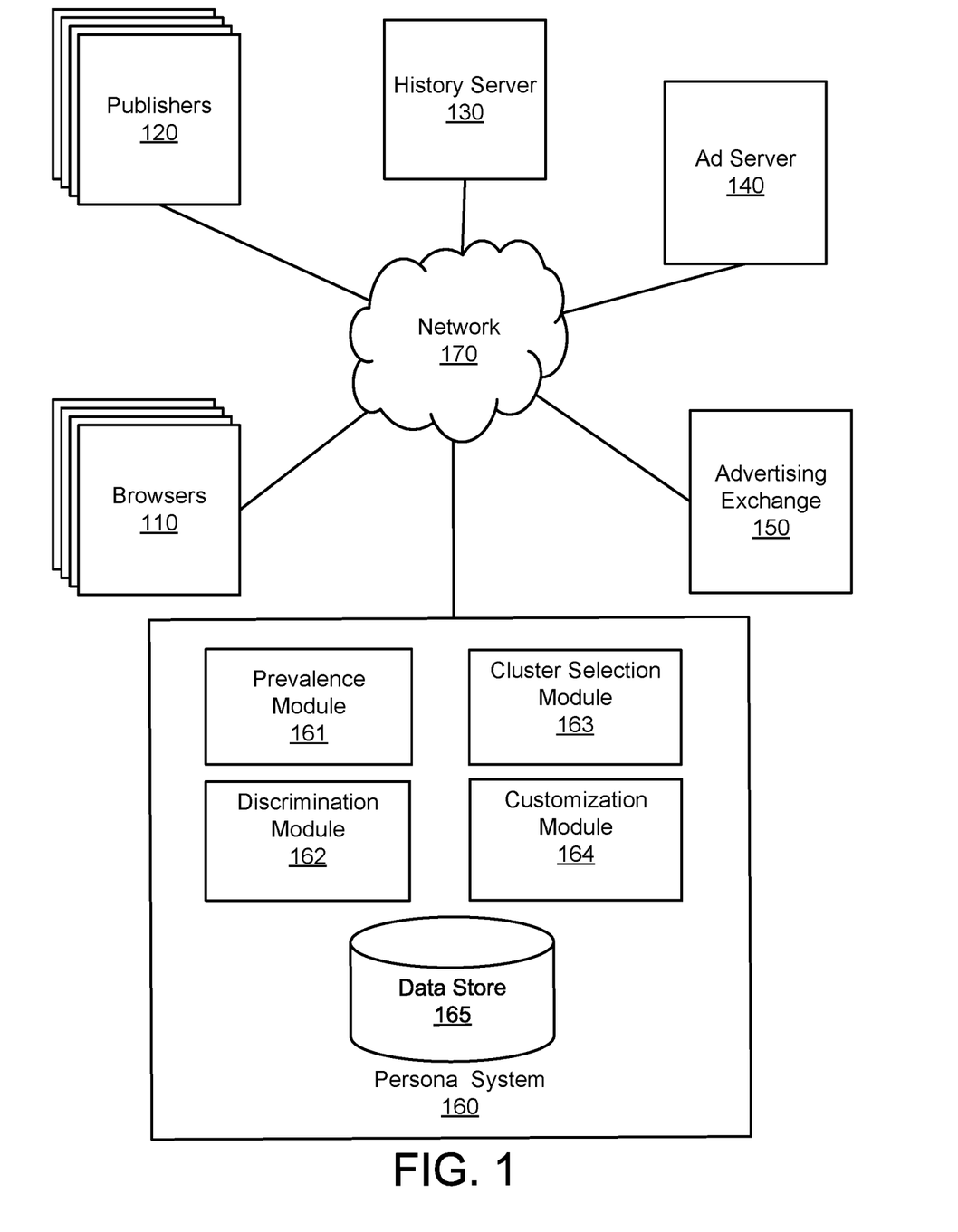

FIG. 1 is a high-level block diagram of a computing environment for sending customized content (e.g. customized web page, customized advertising content), to an entity (e.g. a browser 110), responsive to a request from the entity, in accordance with an embodiment of the invention. The computing environment includes users' browsers 110, publishers 120, a history server 130, an ad server 140, an advertising exchange 150, and a persona system 160. These elements are connected by a communication network 170, such as a local area network, a wide area network, a wireless network, an intranet, a cable network, a satellite network, a cellular phone network, an optical network, the Internet or combinations thereof.

An entity can be an application such as a user's browser 110. A browser 110 can be a web browser executing on a user device, such as a desktop computer or a mobile phone, as the users of those devices browse the web. An entity can represent a networked consumer and can be a device (e.g. a mobile device, wearable device or a desktop computer) or an application (e.g. a cell phone game, cell phone application). For example, an application can be executed on a user device, such as a personal computer, laptop computer, tablet computer, smartphone, a specialized hardware gaming device and a wearable device. An entity can be associated with an anonymous identifier, such as a device identifier, an application identifier or both.

Examples of entities can include software installations or hardware devices used to access content over a network or combinations thereof. Software installations can include a web browser instance, video viewer instance or set-top box software residing on a hardware device. A hardware device can comprise a computer, personal digital assistant (PDA), cell phone, a networked gaming device, an augmented reality (AR) system or set-top unit (STU) such as a STU used in conjunction with cable television service.

A variety of methods exist for associating an anonymous identifier with an entity. For example, a hardware device identifier such as a Media Access Control Address (MAC address), an International Mobile Station Equipment Identity (IMEI), a Mobile Equipment Identifier (MEID), or an Electronic Serial Number (ESN) can be stored on a device operated by a user to access content over a network. As another example, a software identifier such as a cookie value, an application identifier, an application installation identifier, or an operating system identifier such as an Android_ID or Unique Device ID (UDID) can be locally stored. In an embodiment, identifiers can be composed and/or stored remotely from a device associated with an entity. In some cases, an entity, such as a browser 110, can have multiple identifiers, such as one or more first party cookies, one or more third party cookies, or combinations thereof, which can be used to identify the browser 110 to various systems.

Entities, such as browsers 110 which receive content, such as a web page or advertising content, from a publisher 120, such as a website, can also be called a visitor to that publisher (e.g. a website visitor). A publisher 120 sends content to an entity which can be called a recipient, such as a browser 110, over a network 170. In some cases, content may be streamed from a publisher 120 to an entity such as a browser 110. A web page, advertising content, audio content, video content, multimedia content, and downloadable software are examples of content. Entities, such as browser 110, can receive content from a variety of sources such as a publisher 120, an ad server 140, an advertising exchange 150, or combinations thereof.

The users' browsers 110 are web browsers executing on user devices, such as personal computers, laptop computers, tablet computers, and smartphones, as the users of those devices browse the web. As users undertake their normal web browsing activities using the browsers 110, in one embodiment, data for some media consumption events is reported to the history server 130. A media consumption event is the act of accessing content over a network, such as, but not limited to, accessing a web page from a web server. A history server 130 can collect and/or receive information for a browser or a system in conjunction with the identifier, and may process the information before it is stored in a data store (not shown). For example, when a browser 110 requests content from a content provider, such as a publisher 120, the content provider can direct the browser to submit a pixel request to the history server 130. As a result of a pixel request, and optional subsequent actions and/or interactions, the history server 130 can collect and/or receive information from the browser 110 in conjunction with an identifier in order to enable the maintenance of a coherent body of information, such as a consumption history, a portion of a consumption history, a consumption history score, a consumption history characterization and/or a consumption history digest, over time. The received information enables the history server 130 to record media consumption events in a data store (not shown) in conjunction with an anonymous identifier, such as a cookie value. The data store can be internal to the history server 130 or external to history server 130. Also, in practice, the histories may be stored in a plurality of data stores, such as a distributed network of storage facilities.

In the example illustrated in FIG. 1, the ad server 140 can send content, such as customized content, on behalf of a publisher to entities. For example, ad server 140 can send customized website content to a browser on behalf of a website operator or advertising content to a browser on behalf of an advertiser. For example, as a user operates browser 110 and navigates to a publisher's website that includes ad slot to be auctioned through an advertising exchange 150, the publisher 120 sends instructions to the browser 110 for accessing content to be displayed on the website, including a coded link known as an "ad tag" that points to an advertising exchange 150. The browser 110 uses the ad tag to contact the advertising exchange 150 with a request for an ad suitable for the ad slot. The request may comprise information such as: a browser identifier (e.g. a cookie), an ad slot size (e.g. the dimensions of the ad slot), the type of ad slot (e.g. banner, video), information about the context of the ad slot (e.g. website topic, the URL on which the ad will be delivered), the location of the ad slot within a webpage, or combinations thereof.

The advertising exchange 150 receives the request for the ad from the browser 110 and starts an auction by sending a bid request to potential bidders of the bidding opportunity. In some cases, information can be included with the bid request such as a browser identifier and other data describing the bid opportunity, such as, for example, the URL on which the ad will be delivered, the topic of the webpage on which the ad will appear, site visit frequency, the dimensions of the ad slot, information regarding the ad slot's location in the web page (e.g. above the fold, below the fold) or combinations thereof.

Bidders submit their bids to the advertising exchange 150. The bids can comprise a bid price, advertising content, an ad redirect (e.g. instructions to request the advertising content from an advertising server such as ad server 140), or combinations thereof.

The advertising exchange 150 determines the auction winner from the submitted bids. In some implementations, the advertising exchange 150 may send a notification to the winner and/or the other bidders. The notification may include an indication of whether the bidder won the auction, and may confirm the amount that the winner will be charged for buying the ad placement, which is some cases is the amount of the second highest bid. In some cases, the advertising exchange 150 sends advertising content or an ad redirect to the browser 110. The browser 110 can use an ad redirect to request advertising content. For example, an ad redirect can comprise instructions to request advertising content from an ad server 140, and the browser 110 can subsequently receive advertising content from the ad server 140.

In an embodiment, persona system 160 comprises a prevalence module 161, a discrimination module 162, a cluster selection module 163, a customization module 164 and a data store 165. In some embodiments, the persona system 160 may further comprise a history server, such as history server 130. Persona system 160 receives a plurality of clusters and analyzes the histories of entities assigned to each of the clusters. Each cluster can comprise entities which have been grouped together to represent a set of behaviors, goals or characteristics which are relevant to content publisher such as a website operator or an advertiser. For example, an advertiser or publisher may group entities together in soft clusters representing personas and develop customized content for each persona. A persona is a fictional representation of the goals or behaviors of a group. In some cases, a combination of soft clusters may represent a persona. A cluster (or combination of clusters) can represent different funnel stages for a product (e.g. awareness, consideration), different interests (e.g. news, sports, fashion), different characterizations (e.g. bargain shopper, impulse buyer) or combinations thereof. By developing discriminating features lists which are highly compact and comprise features shared by many entities, the persona system can rapidly choose one or more relevant clusters for a specified entity according to features of the specified entity's history, responsive to a request for content, and send customized content to the specified entity content without introducing unacceptable delays. Advantageously, this enables the persona system to select personas (e.g. select one or more clusters with each cluster corresponding to a respective persona, select a plurality of personas with a combination of clusters corresponding to a persona) using features of a very fresh history, such as the specified entity's most recently visited websites, instead of relying on stale data, such as a browsing history that is one hour or one day old.

The persona system 160 comprises a means for receiving histories. For example, persona system 160 can receive histories from the history server 130 over a network 170. In an embodiment, the history server 130 can be a module of the persona system 160. Each history is associated with an entity and comprises features which represent behaviors such as websites visited, keyword searches entered, online purchases made, etc. Each entity is assigned to at least one cluster. In some cases, the entities are "soft clustered" meaning that an entity can be assigned to multiple clusters. In some cases, the entities are converters. Converters are entities which have completed a conversion, which is an indication of success. For example, a conversion may be a product purchase event, a click-through to particular website, or the completion of an online registration form. In one embodiment, the definition of conversion is made with reference to an observable media consumption event, in which case entities which are converters may be distinguished from entities which are not converters by analyzing a respective entity's history.

The persona system 160 comprises a prevalence module 161 which is one means for generating a feature list for each cluster. A cluster's feature list comprises a list of the features in the histories of the entities assigned to the cluster. Each feature has an in-cluster coefficient. A feature's in-cluster coefficient for a cluster represents the prevalence of entities in the cluster having that feature. In an example, an in-cluster coefficient's value may range from zero (0) to one (1), with an in-cluster coefficient of zero meaning that none of the entities in the cluster have that feature in their histories and an in-cluster coefficient of one meaning that all of the entities in the cluster have that feature in their histories.

Figure 2A:
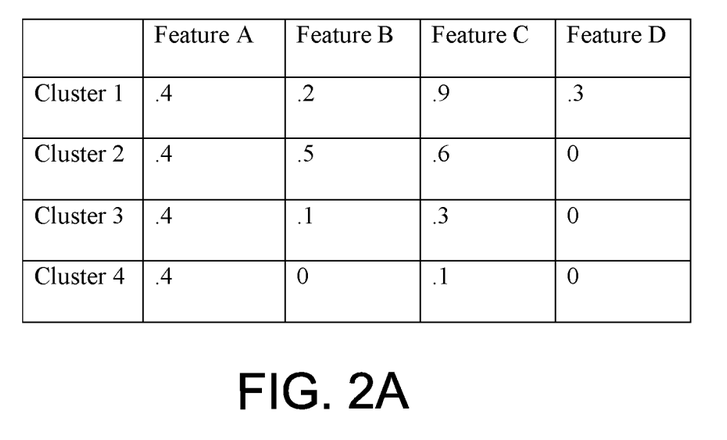
FIG. 2A is a table illustrating an example of in-cluster coefficients of features from the feature lists of four clusters.

FIG. 2A is a table illustrating an example of in-cluster coefficients of features from the feature lists of four clusters. In this example, four features are considered (i.e. Feature A, Feature B, Feature C, and Feature D) with respect to four clusters (i.e. Cluster 1, Cluster 2, Cluster 3, and Cluster 4). Each of the four clusters may correspond to a different persona, a combination of clusters may correspond to a person, or both. In this example, the feature list of Cluster 1 is Feature A, Feature B, Feature C and Feature D. Feature D has an in-cluster coefficient of "0" (zero) for Cluster 2, Cluster 3, and Cluster 4, which indicates that none of the entities in Cluster 2, Cluster 3, or Cluster 4 have Feature D in their histories, whereas the in-cluster coefficients for the other features (i.e. Feature A, Feature B, and Feature C) are non-zero. A non-zero in-cluster coefficient for a feature in a cluster indicates that at least one entity in the cluster has the feature in its history. Accordingly, the respective feature lists for Cluster 2, Cluster 3, and Cluster 4 are the same: Feature A, Feature B, and Feature C (i.e. Feature D is not included in the feature lists of Cluster 2, Cluster 3, or Cluster 4).

Features can represent media consumption events, such as a website visitation history. A history's features may comprise records of other kinds of media accessed online (e.g. a history of movies watched online, applications downloaded, audio files accessed online, online advertisements viewed). A feature's in-cluster coefficient does not necessarily characterize the frequency of a feature within a history. In an example, a feature can represent a single visit to a website, so that any entity with a history documenting one or more visits to that website would contribute to the in-cluster coefficient, and an entity with a single visit to the website would have the same impact on the in-cluster coefficient as an entity with multiple visits to the website. In another example, a feature can represent a number of visits to the website (e.g. five visits to website A) or a frequency of visits to a website (e.g. three or more visits to website A per day). For example, if a feature represents five visits to a website, then an entity must have five or more visits to the website in their history in order to contribute to the feature's in-cluster coefficient.

Figure 2B:
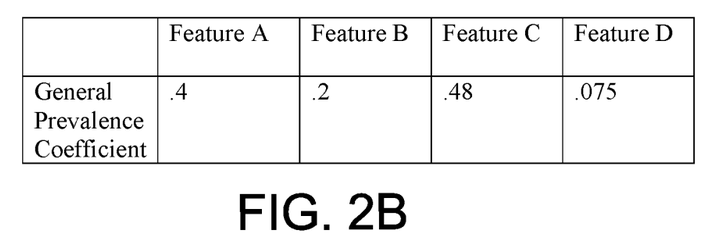
FIG. 2B is a table illustrating an example of general prevalence coefficients for the features of FIG. 2A, with the general population comprising the set of unique entities found in the set of clusters: Cluster 1, Cluster 2, Cluster 3 and Cluster 4.

The prevalence module 161 can determine a general prevalence coefficient for each feature in the feature lists. A feature's general prevalence coefficient represents the prevalence, in a general population, of entities having that feature in their histories. In an embodiment, the general population is the set of entities in the clusters. For example, referring to FIG. 2A, a general population may be the set of unique entities assigned to the set of clusters: Cluster 1, Cluster 2, Cluster 3 and Cluster 4. However, in other examples, a general population may be the general Internet population, a population of a geographic region (e.g. the U.S. Internet Population), a population associated with a time window (e.g. the U.S. Internet population in 2016, the weekday Internet population) or an audience (e.g. a website's general audience). FIG. 2B is a table illustrating an example of general prevalence coefficients for the features shown in FIG. 2A (Feature A, Feature B, Feature C, and Feature D), with the general population comprising the set of unique entities assigned to the set of clusters: Cluster 1, Cluster 2, Cluster 3 and Cluster 4.

The prevalence module 161 can prune a cluster's feature list by comparing the in-cluster coefficient of each feature in the feature list to the respective feature's general prevalence coefficient. For each feature in a cluster's feature list, the prevalence module 161 may compare a respective feature's in-cluster coefficient to its general prevalence coefficient, and select only features with an in-cluster coefficient which differs from the respective feature's general prevalence coefficient by more than a coefficient threshold; in this way, the prevalence module 161 is one means for selecting only features which are helpful for distinguishing an entity from the general population. In some cases, the prevalence module 161 can ignore a feature where the prevalence of entities in the cluster having that feature is the same as is found in the general population (e.g. the coefficient threshold is zero and there is no difference between the prevalence of entities in the cluster having the feature and the prevalence of entities in the general population having the feature). In an example, the prevalence module 161 can ignore a feature where the prevalence of entities in the cluster having that feature is nearly the same as the prevalence of entities in the general population having that same feature (e.g. the difference between the prevalence of entities in the cluster having the feature and the prevalence of entities in the general population having the feature is less than or equal to a coefficient threshold). In some cases, the prevalence module 161 can select a limited number of features from each cluster's feature list. For example, the prevalence module 161 can select the ten features from a cluster's feature list with the largest difference between the in-cluster coefficient and the general prevalence coefficient. Similarly, the prevalence model 161 can ignore the twelve features from a cluster's feature list with the smallest different between the in-cluster coefficient and the general prevalence coefficient. The prevalence module 161 may select the 10% of the features from a cluster's feature list with the largest difference between the in-cluster coefficient and the general prevalence coefficient. Similarly, the prevalence module 161 can ignore the 20% of the features from a cluster's feature list with the smallest different between the in-cluster coefficient and the general prevalence coefficient.

In an example, the in-cluster coefficients of FIG. 2A can be compared to the general prevalence coefficients of FIG. 2B. FIG. 2B shows that the general prevalence coefficient of Feature A is 0.4. The in-cluster coefficient of Feature A for Cluster 1 is also 0.4. By comparing the in-cluster coefficient of Feature A for Cluster 1 (0.4) to the general prevalence coefficient for Feature A (0.4), shows that the prevalence of entities in Cluster 1 with Feature A in their history is the same as the prevalence of entities in the general population (in this example, the population comprising the unique entities of Cluster 1, Cluster 2, Cluster 3 and Cluster 4 taken together). The difference between the in-cluster coefficient of Feature A for Cluster 1 (0.4) and the general prevalence coefficient for Feature A (0.4) is zero, which is less than a non-zero coefficient threshold. Accordingly, Feature A can be ignored for Cluster 1. Similar analysis of the prevalence of Feature A in Cluster 2, Cluster 3, and Cluster 4 results in the same outcome. Accordingly, Feature A would be pruned from the feature lists of Cluster 1, Cluster 2, Cluster 3, and Cluster 4. A similar analysis of Feature B with respect to the clusters would result in Feature B being pruned from the feature list of Cluster 1 because the difference between the in-cluster coefficient of Feature B for Cluster 1 (0.2) and the general prevalence coefficient for Feature B (0.2) is zero, which is less than a non-zero coefficient threshold. Feature B would not be pruned from any other clusters unless the coefficient threshold was greater than 0.1. For example, a coefficient threshold of 0.15 would result in Feature B being pruned from Cluster 3. Similar analyses of Feature C with respect to the clusters would not result in any additional pruning unless the coefficient threshold was at least 0.12 (e.g. a coefficient threshold of 0.13 would result in Feature C being pruned from Cluster 2). Similar analyses of Feature D with respect to the clusters would not result in any additional pruning unless the coefficient threshold was at least 0.075 (e.g. a coefficient threshold of 0.08 would result in Feature D being pruned from Cluster 2, Cluster 3, and Cluster 4).

Figure 2C:
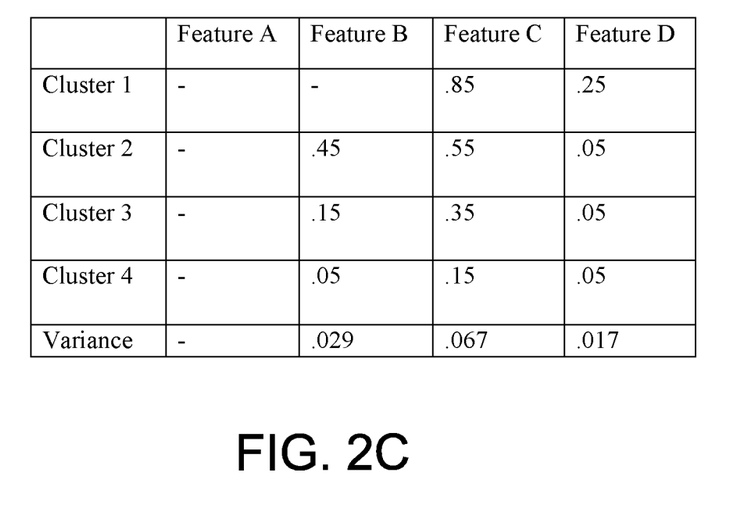
FIG. 2C is a table illustrating an example of in-cluster coefficients which have been shrunken according to a shrinkage parameter of 0.05.

The persona system 160 comprises a discrimination module 162 which is one means for generating a discriminating feature list for each cluster from a respective clusters' respective feature list, such as a pruned feature list generated by the prevalence module 161. The discrimination module 162 is one means for determining a variance of a feature across the clusters. In some cases, the discrimination module may process the in-cluster coefficients before determining the variance across the clusters. For example, the values of the in-cluster coefficients can be shrunk towards their respective means. In an embodiment, the mean value of the feature's in-cluster coefficient is determined from the in-cluster coefficients for the clusters. For example, assuming that the number of entities in each cluster is the same, the mean value of the in-cluster coefficient of Feature B would be the mean value of the in-cluster coefficients of Cluster 1 (0), Cluster 2 (0.5), Cluster 3 (0.1), and Cluster 4 (0) which is 0.15; the in-cluster coefficient of Feature B for Cluster 1 is "0" (zero) because the feature was pruned from Cluster 1's feature list. In an embodiment, if the clusters comprise unequal numbers of entities, then the mean is determined by weighting the in-cluster coefficients proportional to the size of the cluster (i.e. the number of unique entities assigned to the cluster). In an embodiment, to shrink a feature's in-cluster coefficient towards its respective mean, the in-cluster coefficient is adjusted towards the mean value according to a shrinkage parameter. For example, if the in-cluster coefficient is greater than the mean, the in-cluster coefficient can be reduced by the shrinkage parameter; if the in-cluster coefficient is less than the mean, the in-cluster coefficient can be increased by the shrinkage parameter. FIG. 2C is a table illustrating an example of in-cluster coefficients which have been shrunken according to a shrinkage parameter of 0.05.

For each feature in a feature list, such as a pruned feature list, the discrimination module 162 determines a variance of in-cluster coefficients across the clusters. The variance can be determined with respect to shrunken in-cluster coefficients. FIG. 2C illustrates an example of variance determined for Feature B, Feature C and Feature D from the shrunken in-cluster coefficients. The discrimination module selects only features which exhibit a significant variance across the clusters (e.g. features with a variance greater than a variance threshold, only the features with the greatest variance) for the discriminating feature lists, ignoring features with low variance across the clusters (e.g. features with a variance less than a variance threshold, the features with the lowest variance). As a result, features which cannot be used to discriminate between clusters are ignored. Referring to FIG. 2C, Feature D may be ignored (i.e. not selected for any discriminating feature list) for a variance threshold which is greater than 0.017. So, despite the fact that Feature D is very distinctive (i.e. it only appears in one cluster), the persona system 160 would exclude Feature D from all of the discriminating feature lists in some cases.

In some cases, in addition to using a variance threshold or instead of using a variance threshold, the discrimination module 162 can select a limited number of features for each cluster's discriminating feature list. For example, the discrimination module 162 can produce a discriminating feature list by selecting the ten features from a cluster's feature list with the largest variance or ignoring the twelve features from a cluster's feature list with the smallest variance. The discrimination module 162 can produce a discriminating feature list by selecting the 10% of the features from a cluster's feature list with the largest variance or ignoring the 20% of the features from a cluster's feature list with the smallest variance. In an embodiment, not all clusters are required to have the same discriminating feature list.

In some implementations, the modules may be operated to produce a discriminating feature list in an order other than the previously described. For example, in some cases, the persona system 160 may operate by first producing a pruned feature list (prevalence module 161) and the discrimination module 162 can subsequently produce a discriminating feature list by selecting features from the pruned feature list; in other examples, the high variance features may be selected from a feature list before the prevalence module 161 generates a cluster's discriminating feature list by selecting features from the cluster's list of selected high variance features having an in-cluster coefficient which differs from the respective feature's general prevalence coefficient by more than a coefficient threshold. Although four clusters were described in the example above, it is understood that in operation, there may be as few as two clusters or more than four clusters. Although four features were described in the example above, it is understood that in operation, there may be as few as two features or more than four features.

The persona system 160 comprises a cluster selection module 163 which is one means for choosing at least one cluster for a specified entity by comparing the features of an entity to features in the discriminating feature lists of the clusters. In an embodiment, persona system 160 receives an entity's history. For example, the persona system 160 may receive an entity's identifier, such as a cookie, which can be used to access the entity's history from the data store 165 or the history server 130. In various embodiments, the entity's identifier may be received from the entity (such as browser 110), a publisher 120, or advertising exchange 150. In some embodiments, the entity's history is sent directly or indirectly to the persona system 160 from the entity (e.g. browser 110), the publisher 120, the history server 130 or the advertising exchange 150. In an example, the cluster selection module 163 chooses one or more clusters for a specified entity between the time the entity requests content (such as a web page or advertising content) and the time the requested content is provided to the entity. Accordingly, it is extremely important that the cluster selection module 163 operates rapidly enough to avoid interfering with the browsing experience of the user operating the browser.

Cluster selection module 163 can be a means for scoring the similarity between a cluster's discriminating feature list and features in an entity's history. For example, the score can reflect the number of features shared by the cluster's discriminating feature list and the features of the entity's history. In an embodiment, each feature in a cluster's discriminating feature list can have a weight, such as the in-cluster coefficient or the shrunken in-cluster coefficient. Feature weights can be used in conjunction with a Bernoulli mixture model to select the most likely clusters for an entity according to the entity's history. For example, the contribution of an individual feature to a similarity score for a given cluster could be:

$$(\mu^t) \times (1-\mu)^{(1-t)} \qquad \text{(Eq. 1)}$$

In Equation 1 (Eq. 1), the symbol $\mu$ represents the weight (e.g. a coefficient, the in-cluster coefficient, the shrunken in-cluster coefficient), the letter "t" has a value of "0" (zero) if the feature is not found in the entity's history, the letter "t" has a value of "1" (one) if the feature is found in the entity's history. To determine the similarity between a cluster's weighted discriminating feature list and features in an entity's history, the contributions from each individual feature in the discriminating feature list can each be determined and then multiplied together. In an embodiment, cluster selection module 163 can determine a respective similarity for each of a plurality of clusters, and one or more of the clusters with the strongest similarity can be chosen.

The persona system 160 comprises a customization module 164 which is one means for customizing content according to one or more selected clusters and sending the customized content to an entity, such as browser 110, over a network. In an example, an advertiser may provide a persona system with multiple soft clusters of entity histories. Each cluster, or combination of clusters, can have an associated item of content (e.g. an advertising creative for display in an ad slot, an article for publication on a website), content customization instructions (e.g. a coupon amount for insertion into an advertising creative, a captioned image for publication in conjunction with a news article on a webpage), or combinations thereof. In an embodiment, content customization instructions may be operated at the persona system 160 to generate a customized item of content which can be sent to the entity. For example, an advertiser's advertising creative can be customized with a coupon amount for delivery to an entity, with the coupon amount selected according to the entity's selected cluster(s).

In an embodiment, customization module 164 can send content customization instructions to a remote system such as an ad server 140 or publisher 120, which can customize content for delivery to an entity, such as browser 110, according to the content customization instructions of the entity's selected cluster. In some cases, the content customization instructions can be sent to an entity where they are operated to generate customized content for viewing at the entity, such as browser 110. For example, an advertiser's advertising creative can be customized with a coupon amount for display to an entity, with the coupon amount selected according to the entity's selected cluster at a browser 110.

In some cases, content (such as a webpage or an advertising creative) may have a plurality of customizable characteristics (e.g. customizable text, images, color palette, user interface elements). Each customizable characteristic may be associated with a plurality of options, with each option associated with one or more clusters. For example, a restaurant advertiser may have a graphic comprising three customizable characteristics: a first customizable characteristic is a customizable menu item associated with a plurality of options (e.g. a first option is an image of a sandwich associated with cluster X, a second option is an image of a salad associated with cluster Y, a third option is an image of a fancy dinner associated with cluster Z), a second customizable characteristic is a customizable slogan (e.g. a first option is the text "kids eat free" associated with cluster X, a second option is the text "healthy food feels good" associated with cluster Y, a third option is the text "romantic dinner for two" associated with cluster Z) and a third customizable characteristic is a customizable user interface element (e.g. a first option is a clickable link to a coupon labeled "click here for a coupon" associated with cluster X, a second option is a clickable link to a website labeled "see our nutritional information" associated with cluster Y, a third option is a clickable link which launches a reservation-making application labeled "make a reservation now" associated with cluster Z).

In an example, cluster selection module 163 has selected two clusters for an entity (e.g. cluster X and cluster Y), with the entity's similarity score for cluster X equal to twice as much as the similarity score for cluster Y, reflecting a much stronger similarity to cluster X than to cluster Y. Content for display to the entity may be customized according to both selected clusters. In some cases, the impact of a cluster on the customization of content for display to an entity may be proportional to the cluster's similarity score with respect to the entity. For example, because the entity's similarity score for cluster X is double the similarity score for cluster Y, the persona system may customize twice as many customizable characteristics according to cluster X compared to cluster Y when preparing customized content or instructions for customizing content targeted for the entity. For example, considering the restaurant advertiser's graphic with three customizable characteristics, the first and second customizable characteristics may be customized according to cluster X (in this case, the customizable menu item may be an image of a sandwich and the customizable slogan may be the text "kids eat free", both options associated with cluster X) and customize the third customizable characteristic according to cluster Y (in this case, the customizable user interface element may be a clickable link to a website labeled "see our nutritional information", an option associated with cluster Y).

Advantageously, this enables the customization of content to an entity according to the entity's similarity to a plurality of clusters, which can represent one or more personas.

Figure 3:
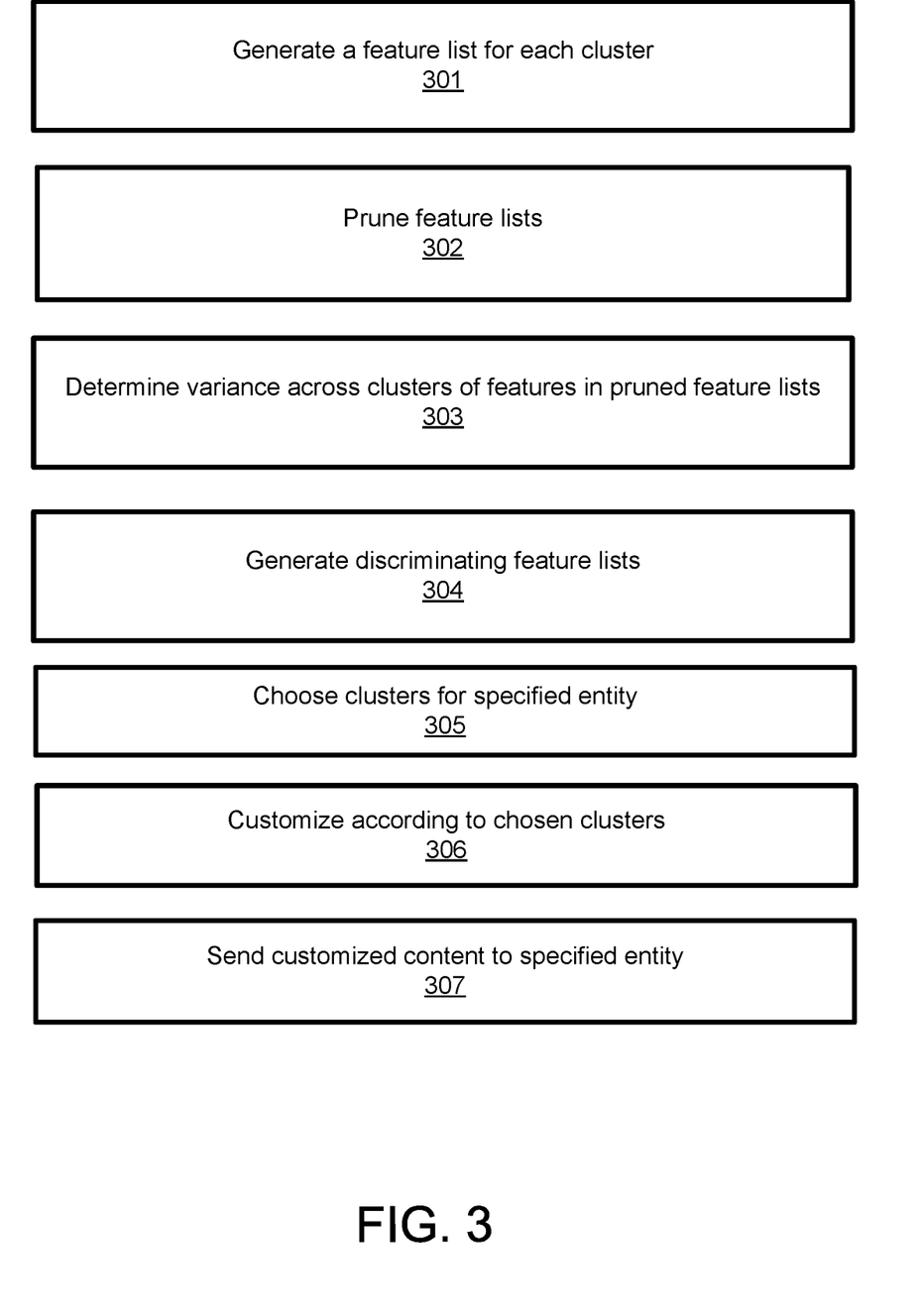
FIG. 3 is a flow chart illustrating a method of automated persona feature selection, in accordance with an embodiment of the invention.

FIG. 3 is a flow chart illustrating a method of sending customized content, in accordance with an embodiment of the invention. In some implementations, the steps are performed in an order other than the order presented in FIG. 3, and in other implementations, additional or alternative steps may be performed.

In step 301, a feature list is generated for each cluster. Histories of a plurality of entities are received. Each history comprises a plurality of features associated with a respective entity. The entities are soft-clustered, with each entity assigned to one or more clusters from the plurality of clusters. Each feature has a general prevalence coefficient representing prevalence of entities in the plurality of entities having the respective feature in their history. In an example, general prevalence coefficients can be determined by an embodiment of the invention. A respective feature list is generated for each cluster. A cluster's feature list comprises the features in the histories of the entities assigned to the respective cluster, each feature having an in-cluster coefficient representing prevalence of entities in the respective cluster having the respective feature in their history. In an example, in-cluster coefficients can be determined by an embodiment of the invention.

In step 302, feature lists are pruned. In an embodiment, a feature list can be pruned by selecting only features having an in-cluster coefficient that is different from the selected feature's general prevalence coefficient by at least a coefficient threshold. In an example, only features where the prevalence of entities in the cluster having the feature in their history is higher than the prevalence of entities in the plurality of entities having the feature are selected; in this case, entities with the feature are more prevalent in the cluster than they are in the greater group of entities (e.g. the plurality of entities). In an embodiment, features which are less prevalent in the cluster than they are in the greater group of entities (e.g. the plurality of entities) may be included in the selected feature list. In some cases, a cluster's feature list may be pruned to a limited number of features (e.g. the ten features with the greatest difference between in-cluster coefficient and general prevalence coefficient).

In step 303, a variance across clusters of features is determined for features in the pruned feature lists. For each feature that appears in a pruned feature list (i.e. a list of selected features), a variance across the clusters can be determined. This variance represents the how much the prevalence of entities with a particular feature in a cluster varies across all of the clusters. For example, a feature which has roughly the same in-cluster coefficient in all of the clusters will have a very low variance; in contrast, a feature which has an in-cluster coefficient that varies significantly from cluster to cluster will have a higher variance.

In step 304, a discriminating feature list is generated for each respective cluster. Features from a pruned feature list which have a variance greater than a variance threshold value may be selected for a cluster's discriminating feature list. In some cases, a limited number of features may be selected for a cluster's discriminating feature list (e.g. the ten features from the discriminating feature list with the highest variance).

In step 305, one or more clusters are chosen for a specified entity. In an embodiment, the cluster(s) are chosen responsive to receiving a request for content, such as a request for a webpage or advertising content. In an example, a request for content is received at a persona system 160. The request for content can comprise an identifier of the specified entity. The persona system 160 may retrieve a history of the specified entity. For example, a request for a history of the specified entity may be sent from the persona system 160 to a history server, such as history server 130, with the request for the history comprising an identifier of the specified entity such as the identifier received in the request for content. Responsive to receiving the specified entity's history, the persona system can choose one or more clusters by comparing features of the history of the specified entity to features of the respective discriminating feature lists of the clusters.

In step 306, content can be customized according to the chosen cluster(s). In an embodiment, persona system 160 may customize advertising content and send the customized content directly or indirectly to the specified entity. In an embodiment, persona system may generate content customization instructions for execution at the specified entity instead of or in addition to generating customize content. When executed at the specified entity, the content customization instructions generate customized content which can be displayed at the specified entity.

In step 307, the customized content is sent directly or indirectly to the specified entity. In an embodiment, content customization instructions are sent directly or indirectly to the specified entity instead of, or in addition to, the customized content.

Figure 4:
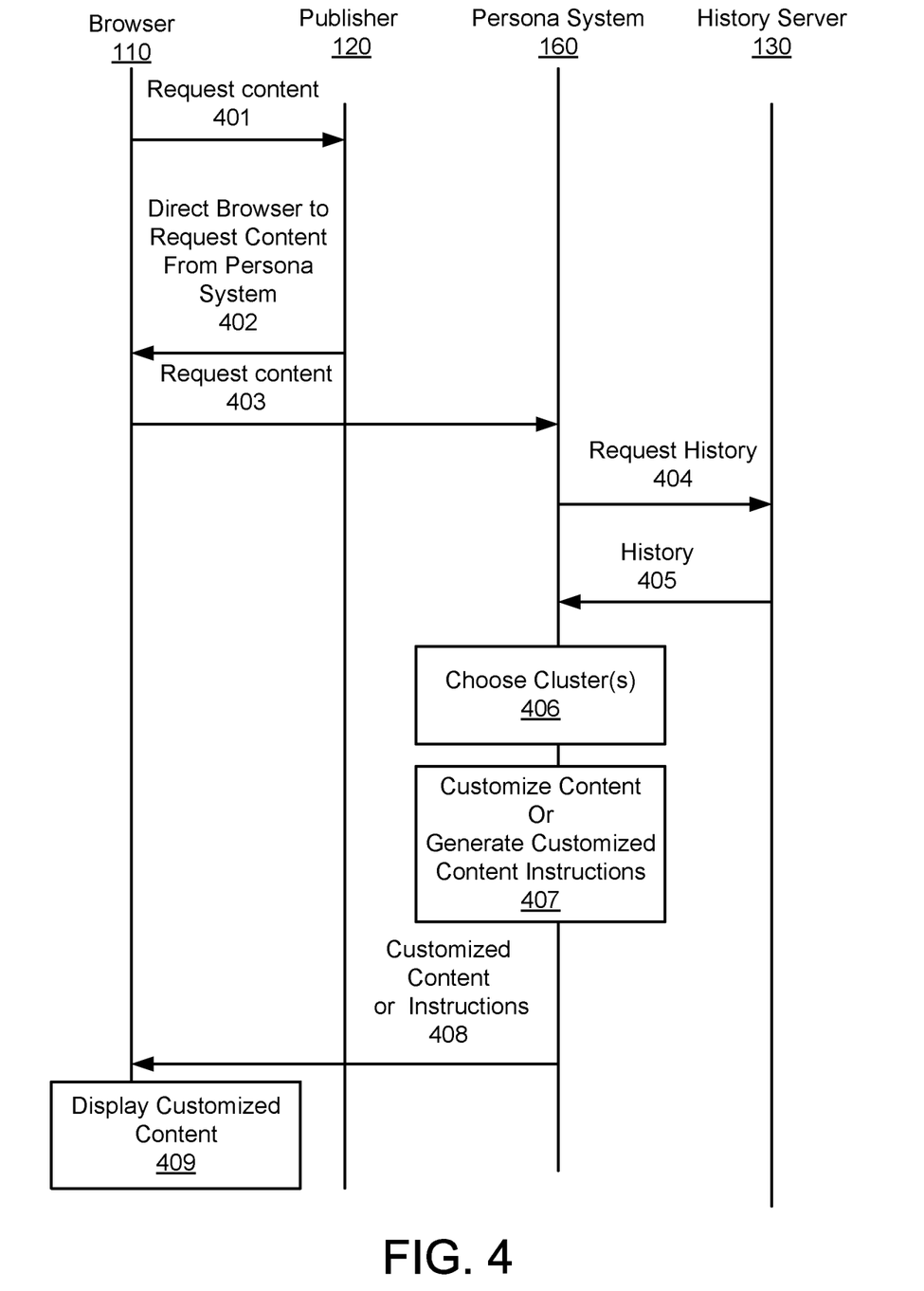
FIG. 4 is an interaction diagram, in accordance with an embodiment of the invention.

FIG. 4 is an interaction diagram, in accordance with an embodiment of the invention. It is noted that FIG. 4 is merely illustrating an example of customizing content and delivering customized content to entities in an online environment, and the interactions depicted in FIG. 4 may vary in other examples.

In the scenario illustrated in FIG. 4, as a user operates browser 110 and navigates to a publisher's website. In step 401, browser 110 sends a request for content (e.g. a web page) to the publisher 120. The publisher 120 receives the request for content.

The publisher 120 receives the request for content from the browser 110. The publisher may provide some content, such as a portion of a web page, responsive to the request for content (401). In step 402, the publisher directs the browser 110 to request content from persona system 160.

In step 403, the browser sends a request for content to the persona system 160. The request for content may comprise an identifier of the browser 110, such as a cookie.

In step 404, the persona system 160 requests a history of the browser 110 from the history server 130. The request to the history server may comprise an identifier of the browser.

In step 405, the browser's history is sent to the persona system 160. The history comprises features such as a list of websites visited by the browser 110.

In step 406, the persona system 160 chooses one or more clusters for the browser 110, responsive to receiving the browser's history. A cluster is chosen by comparing the features of the entity's history to features of the discriminating feature lists of clusters (e.g. the discriminating feature lists generated in step 304 of FIG. 3). As each cluster or set of clusters, can represent a persona, choosing clusters can mean choosing applicable personas.

In step 407, content can be customized according to the chosen cluster(s). Alternately, or in addition to customizing content, content customization instructions can be generated according to the chosen clusters. For example, content customization instructions can be operated at a remote system, such as browser 110 or publisher 120, to generate customized content for display at the browser 110.

In step 408, customized content, instructions for customizing content or both can be sent directly or indirectly to the browser 110.

In step 409, browser 110 receives the customized content, instructions for customizing content or both, and displays customized content.

In some implementations, the process illustrated in steps 401 through 409 of FIG. 4 can be executed in a few seconds. Ideally, the time passage between the browser 110 requesting the content in step 401 and the display of the customized content to an end user in step 409 is short enough not to impact the user's enjoyment of the publisher's website that the user is browsing. In other words, there is no noticeable lag to display the customized content.

Figure 5:
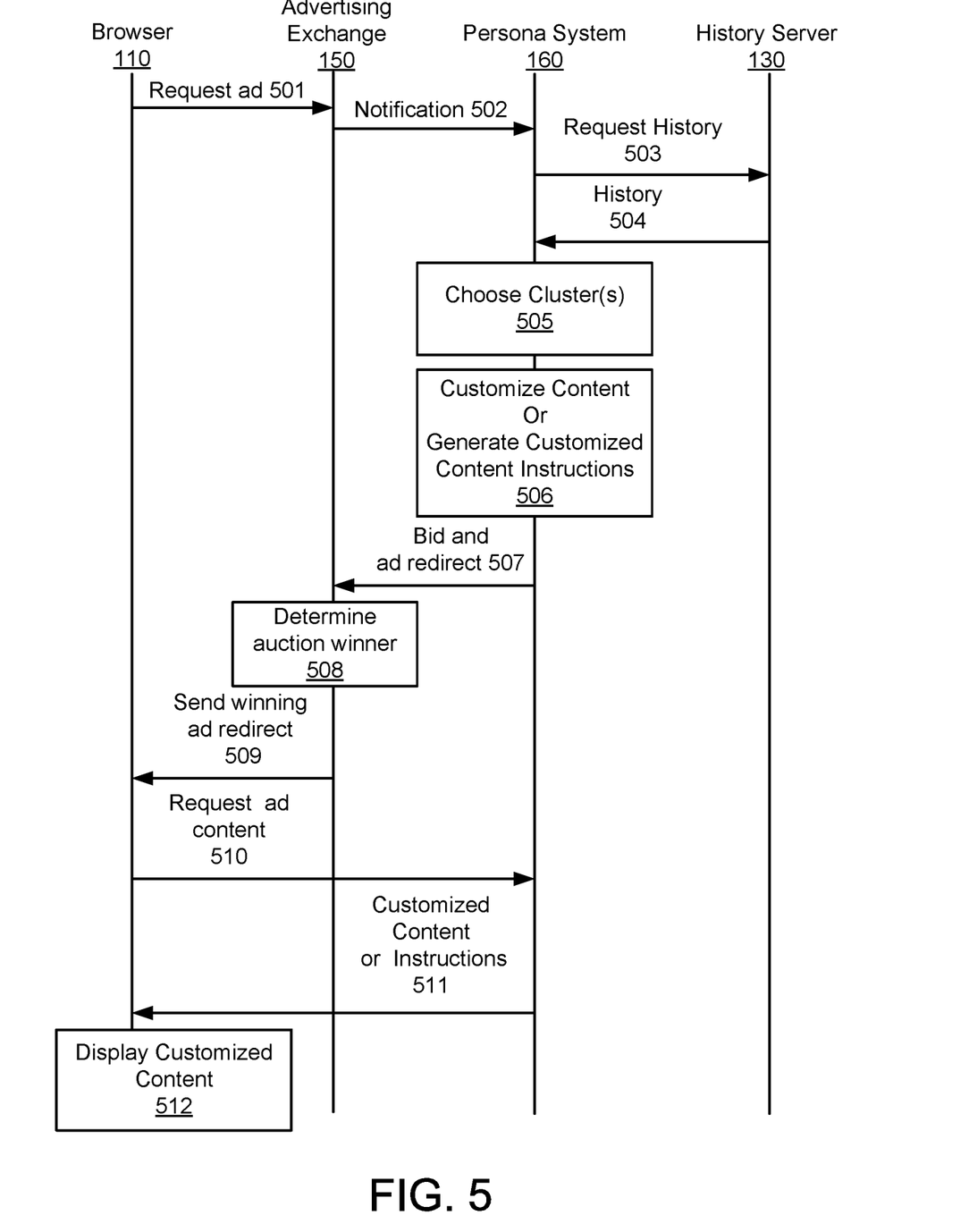
FIG. 5 is an interaction diagram, in accordance with an embodiment of the invention.

FIG. 5 is an interaction diagram illustrating delivering customized content to an online entity, in accordance with an embodiment of the invention. It is noted that FIG. 5 is merely illustrating an example of a real-time bidding environment, and the interactions depicted in FIG. 5 may vary in other examples.

In the scenario illustrated in FIG. 5, a user operates browser 110 and navigates to a publisher's website that includes ad slot to be auctioned in an advertising exchange 150. The publisher's web server sends instructions to the browser 110 for accessing content to be displayed on the website, including a coded link known as an "ad tag" that points to an advertising exchange 150. The browser 110 uses the ad tag to contact the advertising exchange 150 with a request for an ad in step 501.

The advertising exchange 150 receives the request for the ad from the browser 110 and reads the identifier. In response, the advertising exchange starts the auction in step 502 by sending a notification, such as a bid request, to persona system 160 and to other servers to notify potential bidders of the bidding opportunity. Included with the bid request is the identifier and other data describing the bid opportunity, such as, for example, the URL on which the ad will be delivered, the topic of the webpage on which the ad will appear, site visit frequency, and/or the dimensions of the ad slot.

The persona system 160 receives the request for the bid (notification 502), and may match the identifier delivered from the advertising exchange 150 to the persona system's own corresponding identifier, or the history server's identifier, that is linked to a rich set of data, such as the history. In one embodiment, to access the history, the persona system 160 requests the history from the data store 165 or from a history server 130 in step 503 and receives it from the data store 165 or history server 130 in step 504.

In step 505, the persona system 160 chooses one or more clusters for the browser 110, responsive to receiving the browser's history. A cluster is chosen by comparing the features of the entity's history to features of the discriminating feature lists of clusters (e.g. the discriminating feature lists generated in step 304 of FIG. 3). As each cluster or set of clusters can represent a persona, choosing clusters can mean choosing applicable personas.

In step 506, content can be customized according to the chosen cluster(s). Alternately, or in addition to customizing content, such as advertising content, content customization instructions can be generated according to the chosen clusters. For example, content customization instructions can be operated at a remote system, such as browser 110, to generate customized advertising content for display at the browser 110. In an example, customized content, content customization instructions or both can be sent to an ad server 140 (not shown in FIG. 5).

In step 507, if the opportunity of bid request 502 is deemed suitable for an advertising campaign, persona system 160 can send a bid and ad redirect to the advertising exchange 150. The ad redirect provides instructions for redirecting the browser 110 to a server that will serve the ad for the advertising campaign that submitted the winning bid, such as ad server 140 (not shown in FIG. 5) or persona system 160. The ad redirect can comprise instructions for accessing the customized advertising content and/or the content customization instructions generated in step 506.

In step 508, the advertising exchange 150 determines the auction winner from the submitted bids. In some implementations, the advertising exchange 150 may send a notification to the winner and/or the other bidders. The notification may include an indication of whether the bidder won the auction, and may confirm the amount that the winner will be charged for buying the ad placement, which is some cases is the amount of the second highest bid.

In step 509, the advertising exchange 150 sends the ad redirect included with the winning bid to the browser 110.

In step 510, the browser 110 uses the ad redirect to request the customized advertising content, the instructions for generating customized content, or both so that the user can view the customized content in step 512.

In step 511, customized advertising content, the instructions for generating customized advertising content, or both are received.

In step 512, customized advertising content is displayed. In some cases, the customized advertising content is first generated at the browser 110 according to the instructions for generating customized content and then displayed.

In some implementations, the process illustrated in steps 501 through 512 of FIG. 5 can be executed in a few seconds. Ideally, the time passage between the browser 110 requesting the ad in step 501 and the display of customized content (i.e. the customized ad) in step 512 is short enough not to impact the user's enjoyment of the publisher's website that the user is browsing. In other words, there is no noticeable lag to download and display the appropriate ad of the winning bidder in the auction.

Physical Components of a Computer

Figure 6:
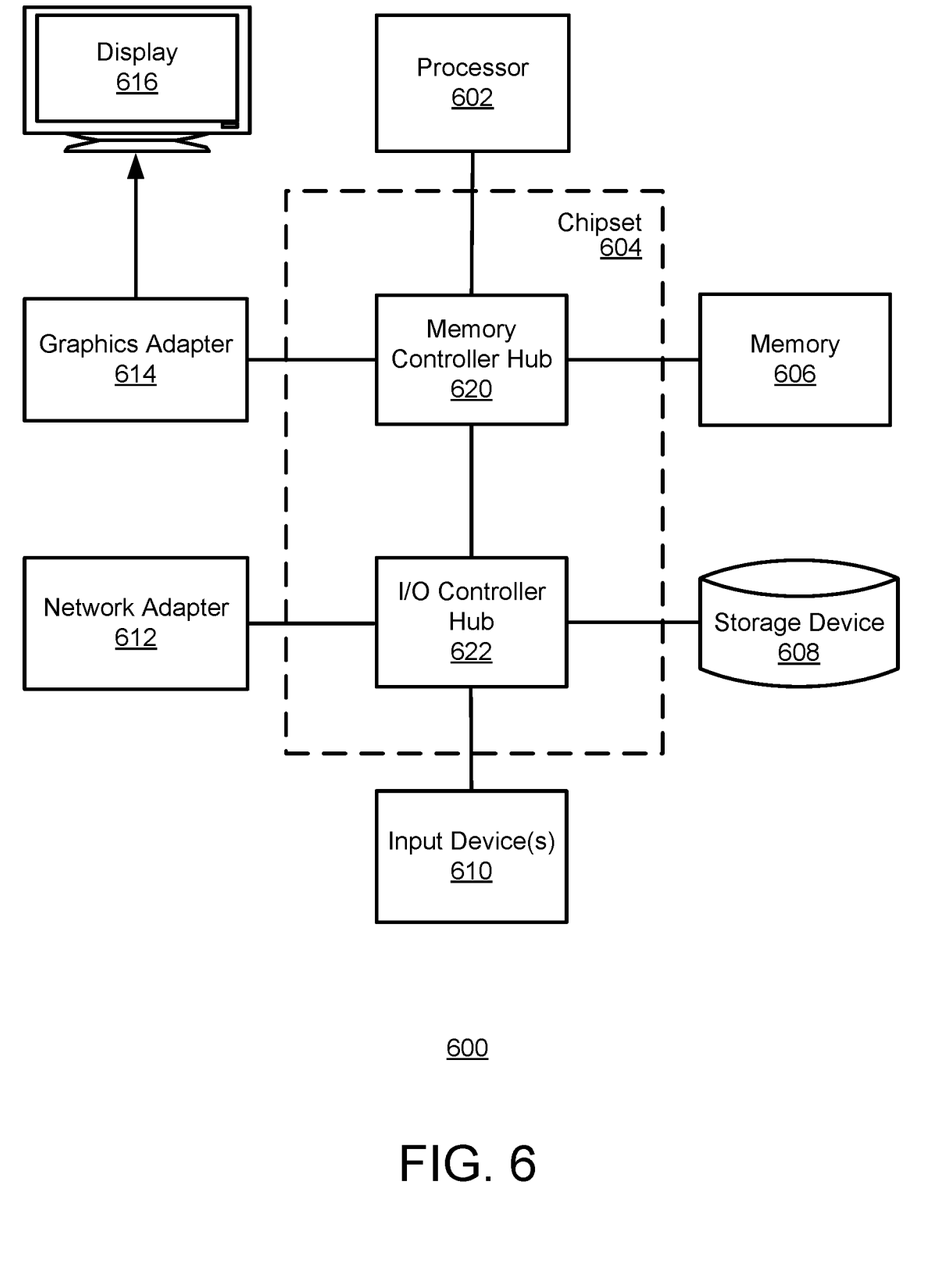
FIG. 6 is a high-level block diagram of the components of a computing system for use, for example, as persona system, publisher, history server, content server, or advertising exchange depicted in FIG. 1, in accordance with an embodiment of the invention.

FIG. 6 is a high-level block diagram of the components of a computing system 600 for use, for example, as persona system 160, publisher 120, history server 130, ad server 140, or advertising exchange 150 depicted in FIG. 1, in accordance with an embodiment of the invention. Illustrated are at least one processor 602 coupled to a chipset 604. Also coupled to the chipset 604 are a memory 606, a storage device 608, input device(s) 610, a network adapter 612, and a graphics adapter 614. A display 616 is coupled to the graphics adapter 614. In one embodiment, the functionality of the chipset 604 is provided by a memory controller hub 620 and an I/O controller hub 622. In another embodiment, the memory 606 is coupled directly to the processor 602 instead of the chipset 604.

The processor 602 is the hardware logic circuitry of the computer 600 that processes instructions such as computer programs to operate on data. The memory 606 holds instructions and data used by the processor 602. The storage device 608 is any non-transitory computer-readable storage medium, such as a hard drive, compact disk read-only memory (CD-ROM), DVD, or a solid-state memory device. The input devices(s) 610 may be a keyboard, mouse, track ball, touch-sensitive screen and/or another type of pointing device to input data into the computer 600. The network adapter 612 couples the computer 600 to a network. The graphics adapter 614 displays images and other information on the display 616.

As is known in the art, a computer 600 can have different and/or other components than those shown in FIG. 6. In addition, the computer 600 can lack certain illustrated components. In one embodiment, a computer 600 acting as a server may lack an input device 610, a graphics adapter 614, and/or a display 616. Moreover, the storage device 608 can be local and/or remote from the computer 600 (such as embodied within a storage area network (SAN)).

As is known in the art, the computer 600 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602. The functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times to refer to these arrangements of functional operations as modules, without loss of generality. The described operations and their associated modules may be embodied in software, firmware, hardware, or any combinations thereof.

The disclosed embodiments also relate to an apparatus for performing the operations described herein. This apparatus may be specially constructed for the required purposes, or it may comprise a general-purpose computer selectively activated or reconfigured by a computer program stored on a computer-readable medium that can be accessed by the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in this disclosure may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience. This description should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs of the disclosed embodiments and applications. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the disclosed embodiments without departing from the spirit and scope of the invention as defined in the appended claims.

What is claimed is:

1. A method, comprising:

receiving histories of a plurality of entities, each respective history comprising a plurality of features, each entity assigned to at least one cluster from a plurality of clusters;

for each of the plurality of clusters, generating a corresponding cluster feature list, each cluster feature list comprising features from the histories corresponding to entities assigned to the respective cluster;

for each of the features comprised in the plurality of cluster feature lists, determining a corresponding variance coefficient across the plurality of clusters, each variance coefficient corresponding to the variance of each of the features across the plurality of clusters;

for each of the plurality of clusters, generating a respective cluster variance feature list comprising a plurality of cluster variance features, the plurality of cluster variance features corresponding to features in the respective cluster feature list having a respective variance coefficient greater than a variance threshold value;

for each of the cluster variance features corresponding to each cluster variance feature list, determining a corresponding general prevalence coefficient, each general prevalence coefficient representing a prevalence of entities in the plurality of entities having the respective cluster variance feature in their history;

for each of the plurality of clusters, determining an in-cluster prevalence coefficient corresponding to each cluster variance feature in the respective cluster variance feature list, the in-cluster prevalence coefficient representing a prevalence of entities in the respective cluster having the respective cluster variance feature in their history;

for each cluster, generating a respective discriminating feature list comprising a plurality of discriminating features, by selecting cluster variance features corresponding to the respective cluster having a difference between each cluster variance feature's corresponding in-cluster prevalence coefficient and the corresponding general prevalence coefficient greater than a prevalence coefficient threshold;

choosing at least one cluster by comparing features of a history of a specified entity to the plurality of discriminating features of the respective discriminating feature list corresponding to each of the plurality of clusters;

customizing content according to the at least one chosen cluster; and sending the customized content to the specified entity.

2. The method of claim 1, further comprising:

assigning each received entity to at least one cluster from the plurality of clusters.

3. The method of claim 1, wherein:

choosing at least one cluster further comprises identifying at least one persona corresponding to the specified entity by comparing features of the history of the specified entity to the plurality of discriminating features of the respective discriminating feature list corresponding to each of the plurality of clusters; and customizing content according to the at least one chosen cluster further comprises customizing content according to the at least one identified persona.

4. The method of claim 1, wherein customizing content according to the at least one chosen cluster comprises:
selecting an item of content associated with the at least one chosen cluster.

5. The method of claim 1, wherein customizing content according to the at least one chosen cluster comprises:
customizing an item of content associated with the at least one chosen cluster.

6. The method of claim 1, wherein customizing content according to the at least one chosen cluster comprises:
providing customization instructions associated with the at least one chosen cluster.

7. The method of claim 6, further comprising:
providing customization instructions associated with the at least one chosen cluster to an ad server.

8. A non-transitory computer-readable storage medium storing processor-executable computer program instructions that, when executed, cause a computer processor to perform a method, the method comprising:
receiving histories of a plurality of entities, each respective history comprising a plurality of features, each entity assigned to at least one cluster from a plurality of clusters;
for each of the plurality of clusters, generating a corresponding cluster feature list, each cluster feature list comprising features from the histories corresponding to entities assigned to the respective cluster;
for each of the features comprised in the plurality of cluster feature lists, determining a corresponding variance coefficient across the plurality of clusters, each variance coefficient corresponding to the variance of each of the features across the plurality of clusters;
for each of the plurality of clusters, generating a respective cluster variance feature list comprising a plurality of cluster variance features, the plurality of cluster variance features corresponding to features in the respective cluster feature list having a respective variance coefficient greater than a variance threshold value;
for each of the cluster variance features corresponding to each cluster variance feature list, determining a corresponding general prevalence coefficient, each general prevalence coefficient representing a prevalence of entities in the plurality of entities having the respective cluster variance feature in their history;
for each of the plurality of clusters, determining an in-cluster prevalence coefficient corresponding to each cluster variance feature in the respective cluster variance feature list, the in-cluster prevalence coefficient representing a prevalence of entities in the respective cluster having the respective cluster variance feature in their history;
for each cluster, generating a respective discriminating feature list comprising a plurality of discriminating features, by selecting cluster variance features corresponding to the respective cluster having a difference between each cluster variance feature's corresponding in-cluster prevalence coefficient and the corresponding general prevalence coefficient greater than a prevalence coefficient threshold;
choosing at least one cluster by comparing features of a history of a specified entity to the plurality of discriminating features of the respective discriminating feature list corresponding to each of the plurality of clusters;
customizing content according to the at least one chosen cluster; and
sending the customized content to the specified entity.

9. The non-transitory computer-readable storage medium of claim 8, wherein the method further comprises:
assigning each received entity to at least one cluster from the plurality of clusters.

10. The non-transitory computer-readable storage medium of claim 8, wherein:
choosing at least one cluster further comprises identifying at least one persona corresponding to the specified entity by comparing features of the history of the specified entity to the plurality of discriminating features of the respective discriminating feature list corresponding to each of the plurality of clusters; and
customizing content according to the at least one chosen cluster further comprises customizing content according to the at least one identified persona.

11. The non-transitory computer-readable storage medium of claim 8, wherein customizing content according to the at least one chosen cluster comprises:
selecting an item of content associated with the at least one chosen cluster.

12. The non-transitory computer-readable storage medium of claim 8, wherein customizing content according to the at least one chosen cluster comprises:
customizing an item of content associated with the at least one chosen cluster.

13. The non-transitory computer-readable storage medium of claim 8, wherein customizing content according to the at least one chosen cluster comprises:
providing customization instructions associated with the at least one chosen cluster.

14. The non-transitory computer-readable storage medium of claim 13, further comprising:
providing customization instructions associated with the at least one chosen cluster to an ad server.

15. A system comprising:
a processor; and
a non-transitory computer-readable storage medium storing processor-executable computer program instructions that, when executed, cause a computer processor to perform a method, the method comprising:
receiving histories of a plurality of entities, each respective history comprising a plurality of features, each entity assigned to at least one cluster from a plurality of clusters;
for each of the plurality of clusters, generating a corresponding cluster feature list, each cluster feature list comprising features from the histories corresponding to entities assigned to the respective cluster;
for each of the features comprised in the plurality of cluster feature lists, determining a corresponding variance coefficient across the plurality of clusters, each variance coefficient corresponding to the variance of each of the features across the plurality of clusters;
for each of the plurality of clusters, generating a respective cluster variance feature list comprising a plurality of cluster variance features, the plurality of cluster variance features corresponding to features in the respective cluster feature list having a respective variance coefficient greater than a variance threshold value;

for each of the cluster variance features corresponding to each cluster variance feature list, determining a corresponding general prevalence coefficient, each general prevalence coefficient representing a prevalence of entities in the plurality of entities having the respective cluster variance feature in their history;

for each of the plurality of clusters, determining an in-cluster prevalence coefficient corresponding to each cluster variance feature in the respective cluster variance feature list, the in-cluster prevalence coefficient representing a prevalence of entities in the respective cluster having the respective cluster variance feature in their history;

for each cluster, generating a respective discriminating feature list comprising a plurality of discriminating features, by selecting cluster variance features corresponding to the respective cluster having a difference between each cluster variance feature's corresponding in-cluster prevalence coefficient and the corresponding general prevalence coefficient greater than a prevalence coefficient threshold;

choosing at least one cluster by comparing features of a history of a specified entity to the plurality of discriminating features of the respective discriminating feature list corresponding to each of the plurality of clusters;

customizing content according to the at least one chosen cluster; and sending the customized content to the specified entity.

16. The system of claim 15, wherein the method further comprises:
assigning each received entity to at least one cluster from the plurality of clusters.

17. The system of claim 15, wherein:
choosing at least one cluster further comprises identifying at least one persona corresponding to the specified entity by comparing features of the history of the specified entity to the plurality of discriminating features of the respective discriminating feature list corresponding to each of the plurality of clusters; and
customizing content according to the at least one chosen cluster further comprises customizing content according to the at least one identified persona.

18. The system of claim 15, wherein customizing content according to the at least one chosen cluster comprises:
selecting an item of content associated with the at least one chosen cluster.

19. The system of claim 15, wherein customizing content according to the at least one chosen cluster comprises:
customizing an item of content associated with the at least one chosen cluster.

20. The system of claim 15, wherein customizing content according to the at least one chosen cluster comprises:
providing customization instructions associated with the at least one chosen cluster.

21. The system of claim 20, further comprising:
providing customization instructions associated with the at least one chosen cluster to an ad server.

* * * * *